US008478269B2

(12) United States Patent
Klingenbrunn et al.

(10) Patent No.: US 8,478,269 B2
(45) Date of Patent: Jul. 2, 2013

(54) METHOD AND APPARATUS TO ENABLE A UE TO RETURN TO A WIRELESS NETWORK AFTER FAILURE TO OBTAIN SERVICE

(75) Inventors: Thomas Klingenbrunn, San Diego, CA (US); Shyamal Ramachandran, San Diego, CA (US); Miguel Griot, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 261 days.

(21) Appl. No.: 13/069,178

(22) Filed: Mar. 22, 2011

(65) Prior Publication Data

US 2012/0071163 A1 Mar. 22, 2012

Related U.S. Application Data

(60) Provisional application No. 61/317,049, filed on Mar. 24, 2010.

(51) Int. Cl.
*H04W 36/36* (2009.01)
(52) U.S. Cl.
USPC .................. 455/435.2; 455/433; 455/440
(58) Field of Classification Search
USPC ........................ 455/435.2, 440, 433
See application file for complete search history.

(56) References Cited

U.S. PATENT DOCUMENTS

2008/0194253 A1* 8/2008 Kuo et al. ............... 455/433

FOREIGN PATENT DOCUMENTS

EP 1898661 A1 3/2008

OTHER PUBLICATIONS

Samsung: "Re-enabling E-UTRAN capability", (3GPP TSG SA WG2 Meeting #78 TD S2-101535 (was S2-101267) Feb. 22-26, 2010 San Francisco USA).*
"3rd Generation Partnership Project; Technical Specification Group Core Network and Terminals; Non-Access-Stratum (NAS) protocol for Evolved Packet System (EPS); Stage 3 (Release 8)", 3GPP Standard; 3GPP TS 24.301, 3rd Generation Partnership Project (3GPP), Mobile Competence Centre; 650, Route Des Lucioles; F-06921 Sophia-Antipolis Cedex; France, No. V8.4.0, Dec. 17, 2009, pp. 1-276, XP050400962, [retrieved on Dec. 12, 2009].
"3rd Generation Partnership Project; Technical Specification Group Services and System Aspects; Architectural requirements (Release 8)", 3GPP Standard; 3GPP TS 23.221, 3rd Generation Partnership Project (3GPP), Mobile Competence Centre; 650, Route Des Lucioles ; F-06921 Sophia-Antipolis Cedex ; France, No. V8.6.0, Dec. 10, 2009, pp. 1-47, XP050400591, [retrieved on Dec. 10, 2009].

(Continued)

*Primary Examiner* — David Q Nguyen
(74) *Attorney, Agent, or Firm* — Kam T. Tam (57) ABSTRACT

Techniques for enabling a user equipment (UE) to return to a wireless network after failure to obtain a particular service (e.g., voice service) are described. The UE may determine that the wireless network does not support the particular service at a first location (e.g., the current UE location). In response, the UE may disable the wireless network and may refrain from attempting to obtain the particular service (or possibly any service) from the wireless network. The UE may thereafter re-enable the wireless network based on a trigger, which may result from a timer, an event, or broadcast information from another wireless network. After re-enabling the wireless network, the UE may perform cell search and system selection and may detect and select the wireless network. The UE may determine that the wireless network supports the particular service at a second location and may obtain the particular service from the wireless network.

27 Claims, 6 Drawing Sheets

OTHER PUBLICATIONS

International Search Report and Written Opinion—PCT/US2011/029839—ISA/EPO—May 31, 2011.
Samsung: "Re-enabling E-UTRAN capability for voice centric UEs", 3GPP Draft; S2-100322_Reenabling_EUTRAN_REV2, 3rd Generation Partnership Project (3GPP), Mobile Competence Centre; 650, Route Des Lucioles; F-06921 Sophia-Antipolis Cedex; France, vol. SA WG2, No. Shenzhen; 20100118, Jan. 12, 2010, XP050432894, [retrieved on Jan. 12, 2010.].

* cited by examiner

METHOD AND APPARATUS TO ENABLE A UE TO RETURN TO A WIRELESS NETWORK AFTER FAILURE TO OBTAIN SERVICE

The present application claims priority to provisional U.S. application Ser. No. 61/317,049, entitled "Methods and Apparatus to Enable Return to the E-UTRAN When a Device Fails to Obtain Voice Services via the E-UTRAN," filed Mar. 24, 2010, assigned to the assignee hereof and incorporated herein by reference in its entirety.

BACKGROUND

I. Field

The present disclosure relates generally to communication, and more specifically to techniques for obtaining services from a wireless communication network.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A UE may desire to obtain a particular service, e.g., voice service. The UE may detect a first wireless network and may realize that this wireless network does not support the desired service. The UE may then disable operation on the first wireless network and may attempt to obtain the desired service from a second wireless network. The UE may continue to operate on the second wireless network even though the first wireless network may be more preferred. There may be some disadvantages to having the UE continue to operate on the second wireless network, as described below.

SUMMARY

Techniques for enabling a UE to return to a wireless network after failure to obtain a particular service (e.g., voice service) from the wireless network are described herein. The UE may determine that the wireless network does not support the particular service at the current UE location. The UE may then be required to disable the wireless network and not obtain any services from the wireless network as long as the UE is powered on, which may be an extended period of time.

In an aspect, the UE may occasionally re-enable the wireless network after failure to obtain the particular service from the wireless network. The wireless network may support the particular service in only a portion of its coverage area. Hence, re-enabling the wireless network may be desirable, for example, when the UE roams to another part of the wireless network where the particular service is supported.

In one design, a UE may determine that a first wireless network does not support a particular service at a first location (e.g., the current UE location). In response, the UE may disable the first wireless network and may refrain from attempting to obtain the particular service (or possibly any service) from the first wireless network. The particular service may be voice service. The UE may be a voice-centric UE and may revert to a voice-capable wireless network (if available) upon determining that the first wireless network does not support voice service. After disabling the first wireless network, the UE may attempt to obtain the particular service from a second wireless network, if available. The UE may remain on the second wireless network even though this wireless network may be less preferred than the first wireless network.

The UE may re-enable the first wireless network based on a trigger. This trigger may result from a timer (which may be set to a fixed value or a variable value), or an event (which may be due to detected movement of the UE), or broadcast information from another wireless network. The trigger is not a result of a change in wireless network for the UE or the UE being powered off and on. After re-enabling the first wireless network, the UE may perform cell search and system selection (e.g., as scheduled for the UE, or immediately after re-enabling the first wireless network). The UE may detect and select the first wireless network during the cell search and system selection. The UE may determine that the first wireless network supports the particular service at a second location (e.g., a new UE location). The UE may thereafter obtain the particular service from the first wireless network.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio access technology (RAT) such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. IS-2000 is also referred to as 1X Radio Transmission Technology (1xRTT), CDMA2000 1X, etc. A TDMA network may implement a RAT such as Global System for Mobile Communications (GSM), Enhanced Data rates for GSM Evolution (EDGE), etc. An OFDMA network may implement a RAT such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and RATs mentioned above as well as other wireless networks and RATs. For clarity, certain aspects of the techniques are described below for LTE.

Figure 1:
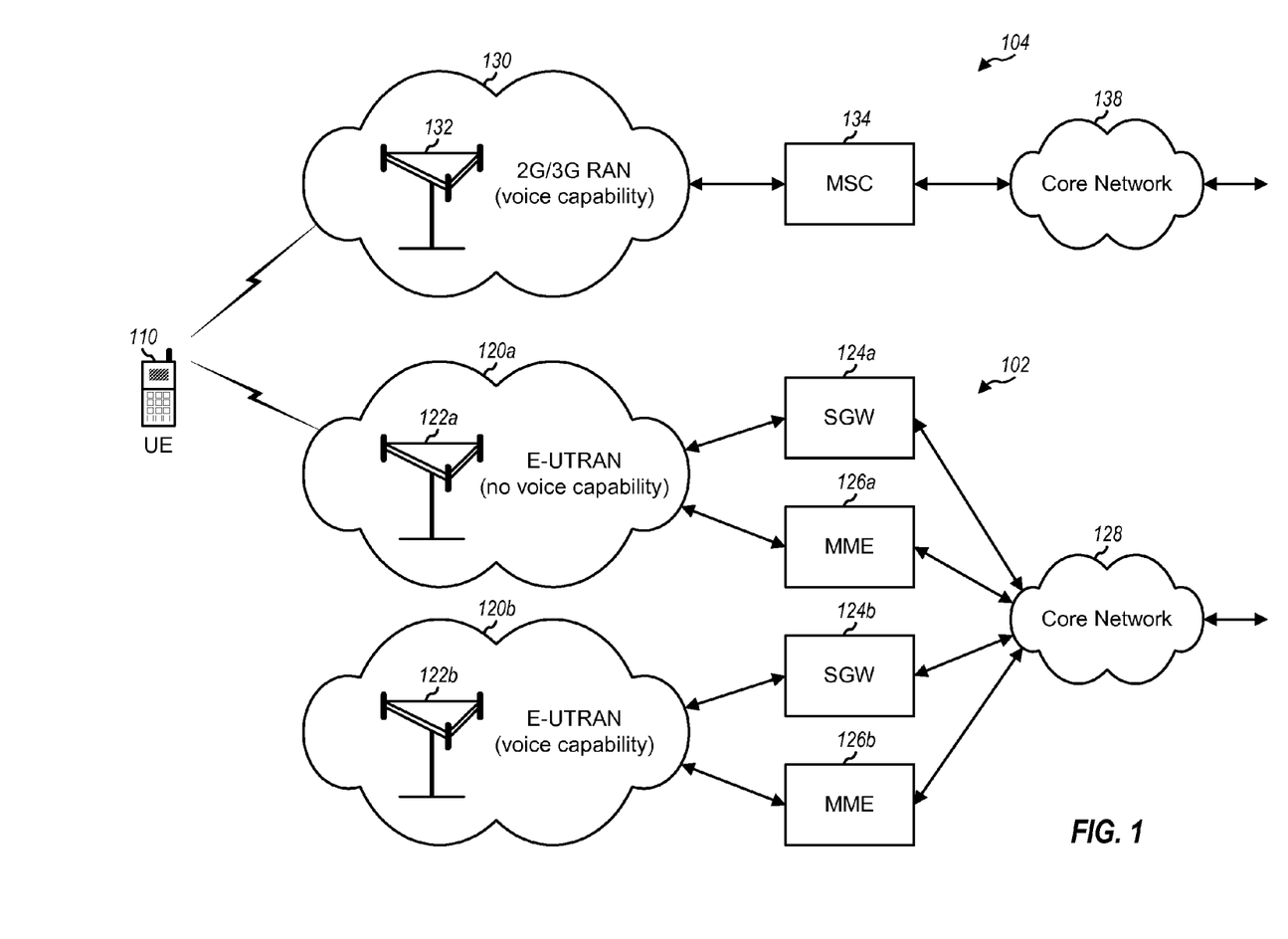
FIG. 1 shows an exemplary deployment of two wireless networks.

FIG. 1 shows an exemplary deployment in which two wireless networks 102 and 104 have overlapping coverage. Wireless networks 102 and 104 may also be referred to as public land mobile networks (PLMNs). A PLMN in 3GPP may be uniquely identified by a specific Mobile Country Code (MCC) and a specific Mobile Network Code (MNC), which may be broadcast by base stations to UEs. Wireless networks 102 and 104 may be operated by the same or different service providers.

Wireless network 102 may be a LTE network and may include Evolved UMTS Terrestrial Radio Access Networks (E-UTRANs) 120a and 120b, Serving Gateways (SGWs) 124a and 124b, Mobility Management Entities (MMEs) 126a and 126b, and a core network 128, which may be coupled as shown in FIG. 1. E-UTRANs 120a and 120b may support a first RAT (e.g., LTE) and may include a number of Evolved Node Bs (eNBs) 122a and 122b and other network entities that can support wireless communication for UEs. Each eNB may be a base station providing communication coverage for a particular geographic area. The term "cell" can refer to a coverage area of an eNB and/or an eNB subsystem serving the coverage area. SGWs 124a and 124b may communicate with E-UTRANs 120a and 120b, respectively, and may perform various functions such as packet routing and forwarding, mobility anchoring, packet buffering, initiation of network triggered services, etc. MMEs 126a and 126b may communicate with E-UTRANs 120a and 120b, respectively, and may perform various functions such as mobility management, bearer management, distribution of paging messages, security control, authentication, gateway selection, etc. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

Wireless network 104 may be a UMTS network, a 1xRTT network, a GSM network, or some other wireless network. Wireless network 104 may include a Radio Access Network (RAN) 130, a Mobile Switching Center (MSC) 134, and a core network 138, which may be coupled as shown in FIG. 1. RAN 130 may be a second-generation (2G) RAN or a third-generation (3G) RAN. A 2G RAN may be a GSM RAN, a GSM/EDGE RAN (GERAN), etc. A 3G RAN may be a UMTS Terrestrial Radio Access Networks (UTRAN), a 1X RAN, etc. RAN 130 may support a second RAT (e.g., WCDMA, 1xRTT, GSM, GSM/EDGE, etc.) and may include a number of base stations 132 and other network entities that can support wireless communication for UEs. MSC 134 may communicate with RAN 130 and may support voice service, provide routing for circuit-switched calls, and perform mobility management for UEs located within the area served by MSC 134. The network entities in UMTS and GSM networks are described in publicly available documents from 3GPP. The network entities in a 1xRTT network are described in publicly available documents from 3GPP2.

For simplicity, FIG. 1 shows only some network entities in wireless networks 102 and 104. Wireless networks 102 and 104 may also include other network entities that may support various functions and services. In general, any number of wireless networks may be deployed in a given geographic area. Each wireless network may employ a particular RAT and may support communication for UEs within its coverage.

Wireless network 102 may include any number of E-UTRANs. Each E-UTRAN may have certain capabilities and may support certain services such as voice, packet data, short message service (SMS), etc. For example, in FIG. 1, E-UTRAN 120a may have no voice capability and may support one or more services but not voice service. E-UTRAN 120b may have voice capability and may support voice and other services. Similarly, wireless network 104 may include any number of RANs, and each RAN may have certain capabilities and may support certain services. For example, in FIG. 1, RAN 130 may have voice capability and may support voice and other services.

A number of UEs may be dispersed throughout the coverage of wireless networks 102 and 104. For simplicity, only one UE 110 is shown in FIG. 1. UE 110 may be stationary or mobile and may also be referred to as a user entity, a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc.

UE 110 may be provisioned with a list of preferred PLMNs from which the UE may receive service. This preferred list may be provisioned by a service provider with which UE 110 has a subscription. The preferred list may normally include a home PLMN (HPLMN) and other PLMNs for which the service provider has roaming agreements. The preferred list may be stored in a Subscriber Identity Module (SIM), a Universal SIM (USIM), or some other non-volatile memory module.

Figure 2:
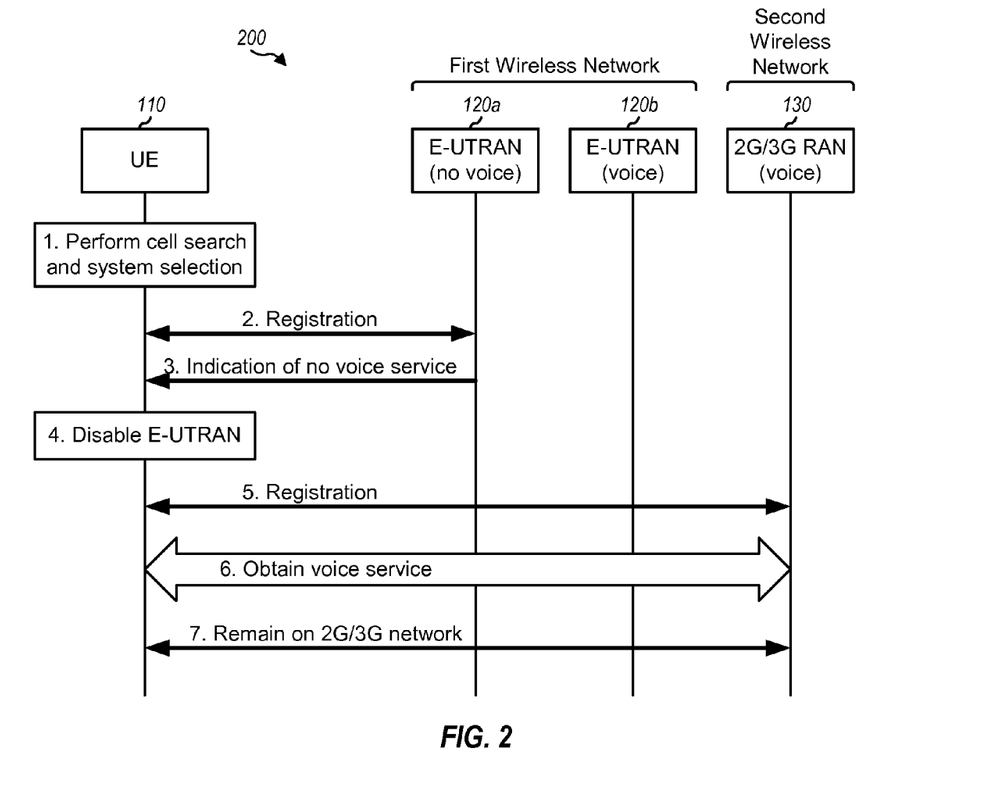
FIG. 2 shows a process for obtaining voice service by a UE.

FIG. 2 shows a flow diagram of a process 200 for obtaining voice service by UE 110. Upon power up, UE 110 may perform cell search to look for wireless networks from which it can receive services (step 1). If multiple wireless networks are detected by the cell search, then UE 110 may perform system selection to select one wireless network to serve UE 110 (also step 1). Cell search and system selection may also be referred to as cell selection, etc. UE 110 may perform system selection based on its list of preferred PLMNs and may select a wireless network that is most preferred among all wireless networks detected by UE 110. In the example shown in FIG. 2, UE 110 may detect both E-UTRAN 120a and 2G/3G RAN 130 and may select E-UTRAN 120a instead of 2G/3G RAN 130 because wireless network 102 is more preferred than wireless network 104.

UE 110 may then perform registration with E-UTRAN 120a (step 2). Alternatively, UE 110 may perform an attach procedure (if the UE is attempting to access E-UTRAN 120a) or a tracking area update procedure (if the UE is already registered with wireless network 102). In any case, E-UTRAN 120a may not have voice capability and may provide an indication of no voice service (step 3). In general, E-UTRANs in LTE only support packet switched (PS) services and not circuit switched (CS) services. An E-UTRAN may support voice service with Voice-over-Internet Protocol (VoIP) or CS fallback (CSFB). For VoIP, packets for voice may be exchanged between a UE and an E-UTRAN in similar manner as packets for other services, typically with certain quality of service (QoS) guarantees for voice service. In one mechanism for CSFB, an E-UTRAN may issue a connection release with redirection message to a UE. The UE may then be required to disconnect from the E-UTRAN and initiate an access procedure to a CS-capable RAN. An E-UTRAN may not support voice service if it does not support VoIP or CSFB.

UE 110 may recognize that E-UTRAN 120a does not support voice service based on the indication received from E-UTRAN 120a in step 3. UE 110 may be a voice-centric UE and may revert to a 2G/3G network if voice service is not available. This is in contrast to a data-centric UE that may revert to data service on the same LTE network if voice service is not available. As a voice-centric device, UE 110 may be required to disable E-UTRAN, as specified in LTE Release 8, in response to receiving the indication of no voice capability from E-UTRAN 120a (step 4). UE 110 would then not attempt to obtain any service from E-UTRAN in the same wireless network 102 as long as UE 110 is powered on.

UE 110 may then determine that 2G/3G RAN 130 is detected and that wireless network 104 is the most preferred wireless network that is currently available to UE 110. UE 110 may perform registration with 2G/3G RAN 130 (step 5). UE 110 may then obtain voice service via 2G/3G RAN 130 (step 6). UE 110 may remain on 2G/3G RAN 130 until another RAN in a more preferred wireless network is detected (step 7).

In general, voice-centric UE 110 may disable E-UTRAN if the UE is unable to obtain voice service from the E-UTRAN. Some reasons for this may include an E-UTRAN indicating "CSFB is not preferred", if CS registration fails for the UE, or if the E-UTRAN indicates that CS registration is for "SMS only". Upon disabling E-UTRAN due to UE 110 being unable to obtain voice service, E-UTRAN would remain disabled until UE 110 is powered off and on or until UE 110 moves to a different wireless network.

UE 110 may be a mobile device that may remain powered on for weeks or even months. Furthermore, UE 110 may stay within the same wireless network for equally long periods of time. Hence, UE 110 may get "stuck" on a 2G/3G network for an extended period of time. This may be undesirable from a service provider perspective because many newly deployed LTE UEs may effectively operate as 2G/3G UEs due to no voice service. Some drawbacks of voice-centric UEs being stuck on 2G/3G networks include:

The UEs would be limited to 2G/3G data rates,
Data off-load to LTE would not be possible for these UEs, and
Gradual rollout of LTE Release 8 CSFB may not be an option because most voice-centric UEs would effectively end up being 2G/3G UEs.

Hence, it may be desirable to have a mechanism that can eventually return voice-centric UEs to E-UTRAN, so that these UEs can again attempt registering on E-UTRAN.

In an aspect, a UE that has disabled E-UTRAN (e.g., due to no voice service) may occasionally re-enable E-UTRAN. Re-enabling E-UTRAN may result in the UE attempting to register on E-UTRAN at the next opportunity. This may be desirable since the UE may have moved to a different E-UTRAN, which may have voice capability. The UE may then be able to obtain voice service via this E-UTRAN.

Figure 3:
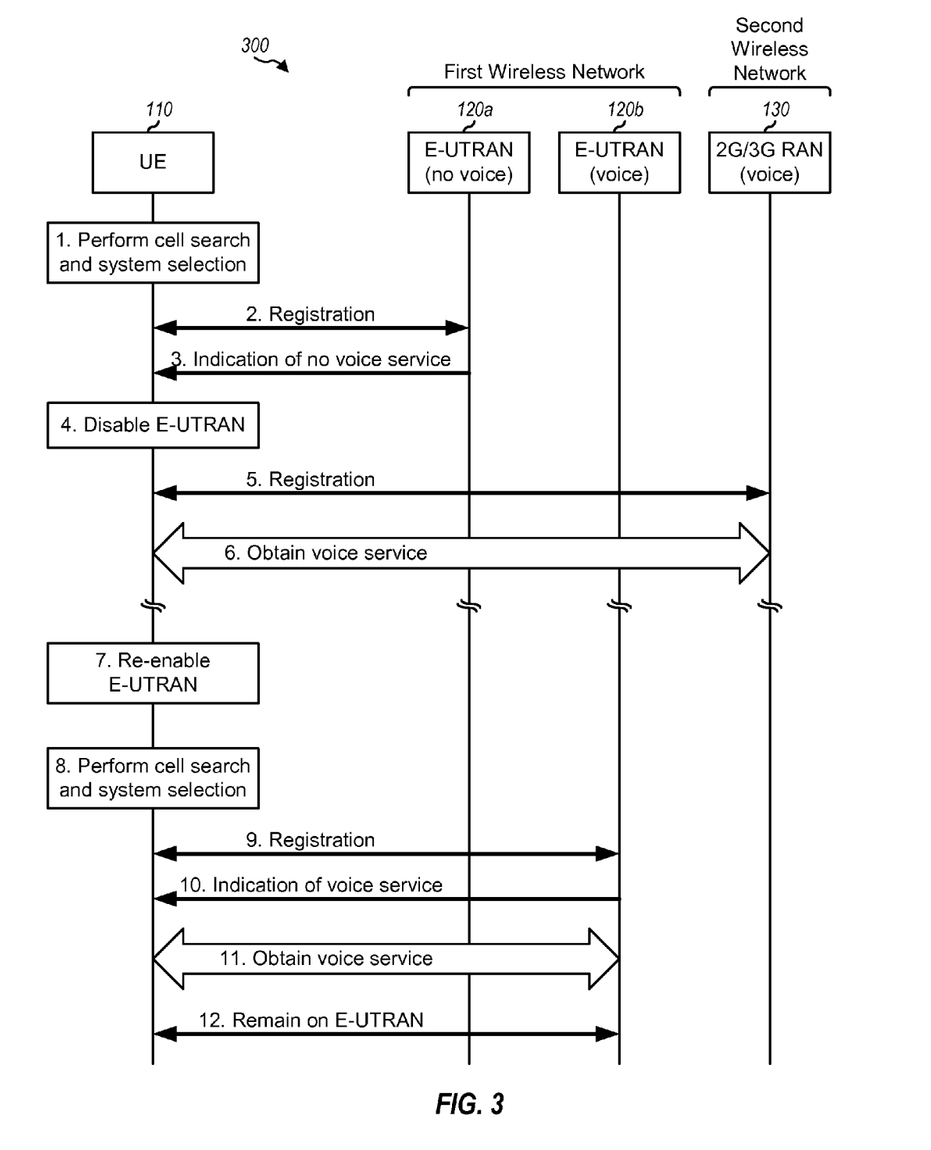
FIG. 3 shows a process for obtaining voice service by a UE after re-enabling a wireless network that initially does not support voice service.

FIG. 3 shows a flow diagram of a design of a process 300 for obtaining voice service by UE 110 with re-enabling of E-UTRAN. Steps 1 to 6 in process 300 may be performed in similar manner as steps 1 to 6 in process 200 in FIG. 2.

After disabling E-UTRAN due to no voice service in step 4, UE 110 may re-enable E-UTRAN at a later time when triggered (step 7). Re-enabling E-UTRAN may allow UE 110 to attempt registration with an E-UTRAN and possibly obtain voice service, e.g., in similar manner as when UE 110 is first powered on. UE 110 may perform cell search based on a schedule selected for UE 110 (step 8). In the example shown in FIG. 3, UE 110 may have moved from the coverage of E-UTRAN 120a to the coverage E-UTRAN 120b during the time from step 4 to step 8. UE 110 may then detect E-UTRAN 120b during the cell search in step 8. If multiple wireless networks are detected by the cell search, then UE 110 may perform system selection to select one wireless network to serve UE 110 (also step 8). In the example shown in FIG. 2, UE 110 may detect both E-UTRAN 120b and 2G/3G RAN 130 and may select E-UTRAN 120b instead of 2G/3G RAN 130 because wireless network 102 is more preferred than wireless network 104.

UE 110 may then perform registration with E-UTRAN 120b (step 9). E-UTRAN 120b may have voice capability and may provide an indication of voice service (step 10). UE 110 may be a voice-centric UE and may not disable E-UTRAN 120b upon receiving the indication of voice service being supported by E-UTRAN 120b. UE 110 may desire voice service and may obtain voice service via E-UTRAN 120b (step 11). UE 110 may remain on E-UTRAN 120b (step 12).

FIG. 3 shows a scenario in which UE 110 moves from E-UTRAN 120a (without voice capability) to E-UTRAN 120b (with voice capability) prior to the cell search and system selection in step 8. In this case, UE 110 may attempt registration with E-UTRAN 120b in step 9 and may not need to disable E-UTRAN after step 9.

In general, UE 110 may or may not move into the coverage of a new E-UTRAN with voice capability since the time that it disables E-UTRAN. If UE 110 has not moved into a new E-UTRAN with voice capability, then UE 110 may detect the same E-UTRAN without voice capability, attempt registration with this E-UTRAN, receive an indication of no voice capability, and again disable E-UTRAN as required in LTE Release 8. UE 110 may thereafter re-enable E-UTRAN and may repeat the same process. UE 110 may thus disenable and re-enable E-UTRAN any number of times.

UE 110 may re-enable E-UTRAN in various manners. In a first design, UE 110 may re-enable E-UTRAN based on a timer. UE 110 may set the timer to a particular value when UE 110 disables E-UTRAN. UE 110 may then re-enable E-UTRAN when the timer expires.

In one design, the timer may be set to a fixed value, which may be selected based on a tradeoff between (i) overhead and power consumption to attempt registration with E-UTRAN and (ii) improvement in performance due to operation on E-UTRAN. In this design, the timer may be uniform, and UE 110 may periodically re-enable E-UTRAN at a fixed periodicity, which may be determined by the fixed value for the timer.

In another design, the timer may be set to a variable value. In one design, the timer may be set to progressively larger value after each detection of no voice service from E-UTRAN. For example, the timer may be set to 5 seconds after the first detection of no voice service from E-UTRAN, then 10 seconds after the second detection of no voice service, then 20 seconds after the third detection of no voice service, etc. The timer may thus expire at a non-uniform rate. In another design, the timer may be set to a value that may be determined based on the frequency of cell reselection by UE 110. Cell reselection refers to selection of a new serving cell for the UE, and more frequent cell reselection may be indicative of movement by the UE. The variable value of the timer may also be determined in other manners.

In a second design, UE 110 may re-enable E-UTRAN based on occurrence of certain events. For example, UE 110 may re-enable E-UTRAN when movement of the UE is detected. Movement may be detected based on positioning capability (e.g., GPS capability) of UE 110 or sensors within UE 110. Movement may also be detected based on changes in cell identity (ID) of serving cells of UE 110 or of cells detected by UE 110. UE 110 may also re-enable E-UTRAN when voice service is requested by a user of the UE. UE 110 may also re-enable E-UTRAN based on other events.

In a third design, UE 110 may re-enable E-UTRAN when informed that E-UTRAN has voice capability. For example, 2G/3G RAN 130 may broadcast information indicating that an E-UTRAN supporting voice service is in the vicinity of 2G/3G RAN 130. UE 110 may then re-enable E-UTRAN upon receiving the broadcast information from 2G/3G RAN 130.

UE 110 may also re-enable E-UTRAN based on other triggers. Re-enabling E-UTRAN may allow UE 110 to attempt registration with E-UTRAN at the next opportunity. In one design, the next opportunity may arise when UE 110 performs cell search and system selection based on its schedule. This design may reduce complexity at UE 110. In another design, re-enabling E-UTRAN may trigger UE 110 to immediately perform cell search and system selection to look for E-UTRAN. This design may allow UE 110 to quickly switch over to E-UTRAN if available. In yet another design, re-enabling E-UTRAN may result in UE 110 performing cell search and system selection based on its schedule or possibly earlier (e.g., if a request for voice service is received from the user).

The techniques described herein may provide various advantages. First, the techniques may allow UE 110 to eventually return to E-UTRAN after having disabled E-UTRAN due for failure to obtain voice service. Otherwise, UE 110 may be effectively stuck on a 2G/3G network indefinitely. Second, the techniques may avoid the three drawbacks described by the three bullets above.

For clarity, the techniques have been specifically described for voice service in E-UTRAN. In general, the techniques may be used for any service that may be supported by part of a wireless network instead of the entire wireless network. For example, the techniques may also be used for SMS, positioning, etc.

Figure 4:
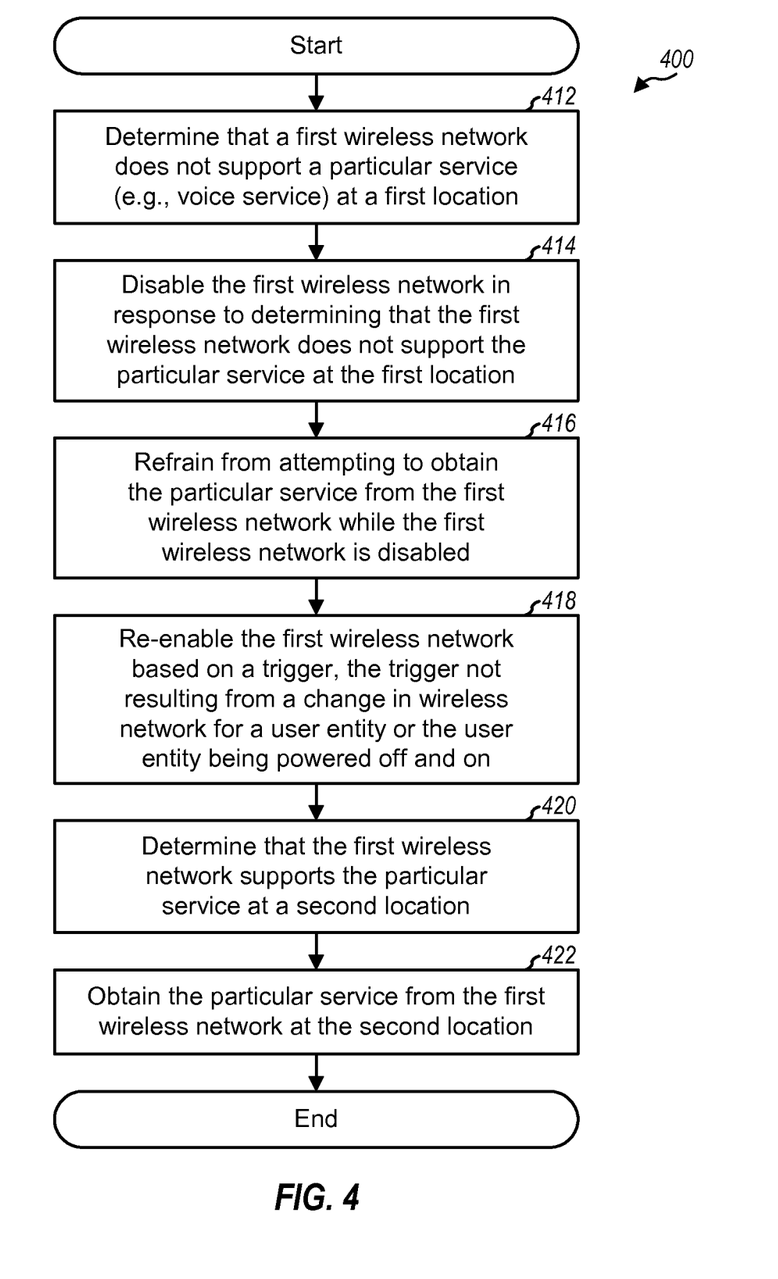
FIG. 4 shows a process for obtaining communication with capability to disable and re-enable a wireless network.

FIG. 4 shows a design of a process 400 for obtaining service. Process 400 may be performed by a user entity (e.g., a UE) as described below or by some other entity. The user entity may determine that a first wireless network does not support a particular service at a first location, e.g., the current location of the user entity (block 412). The user entity may disable the first wireless network in response to determining that the first wireless network does not support the particular service at the first location (block 414). The user entity may refrain from attempting to obtain the particular service (or possibly any service) from the first wireless network while the first wireless network is disabled (block 416). In one design, the user entity may obtain the particular service from a second wireless network after disabling the first wireless network. The second wireless network may be less preferred than the first wireless network for the user entity.

The user entity may re-enable the first wireless network based on a trigger (block 418). This trigger is not a result of a change in wireless network for the user entity or the user entity being powered off and on. The user entity may repeat disabling and re-enabling the first wireless network for any number of times. The user entity may determine that the first wireless network supports the particular service at a second location, e.g., a new location of the user entity (block 420). The first wireless network may support the particular service in only a portion of the coverage area of the first wireless network and hence may support the particular service at the second location but not the first location. The user entity may obtain the particular service from the first wireless network at the second location (block 422).

In one design, the first wireless network may be a LTE network, and the particular service may be voice service. The user entity may disable E-UTRAN in block 414 and re-enable E-UTRAN in block 418. The user entity may be a voice-centric user entity and may revert to a voice-capable wireless network in response to determining that the first wireless network does not support voice service at the first location. The user entity may determine that the first wireless network does not support voice service based on an indication that CSFB is not supported or not preferred by the first wireless network, or that CS registration failed for the user entity, or that CS registration is available only for SMS.

The user entity may determine the trigger in various manners. In one design, the user entity may start a timer upon disabling the first wireless network and may determine the trigger based on expiration of the timer. The user entity may set the timer to a fixed value, or a progressively longer value each time the first wireless network is disabled, or a variable value determined based on detected movement of the user entity or frequency of cell reselection by the user entity, etc. In another design, the user entity may determine the trigger based on occurrence of a designated event at the user entity. For example, the user entity may detect its movement and may determine the trigger based on the detected movement by the user entity. In yet another design, the user entity may receive from another wireless network broadcast information indicating the particular service being available from the first wireless network. The user entity may then determine the trigger based on the broadcast information. The user entity may also determine the trigger in other manners.

In one design, the user entity may immediately or quickly initiate cell search and system selection in response to re-enabling the first wireless network. In another design, the user entity may perform cell search and system selection based on a schedule determined for the user entity. In both designs, the user entity may enable selection of the first wireless network during cell search and system selection after re-enabling the first wireless network.

Figure 5:
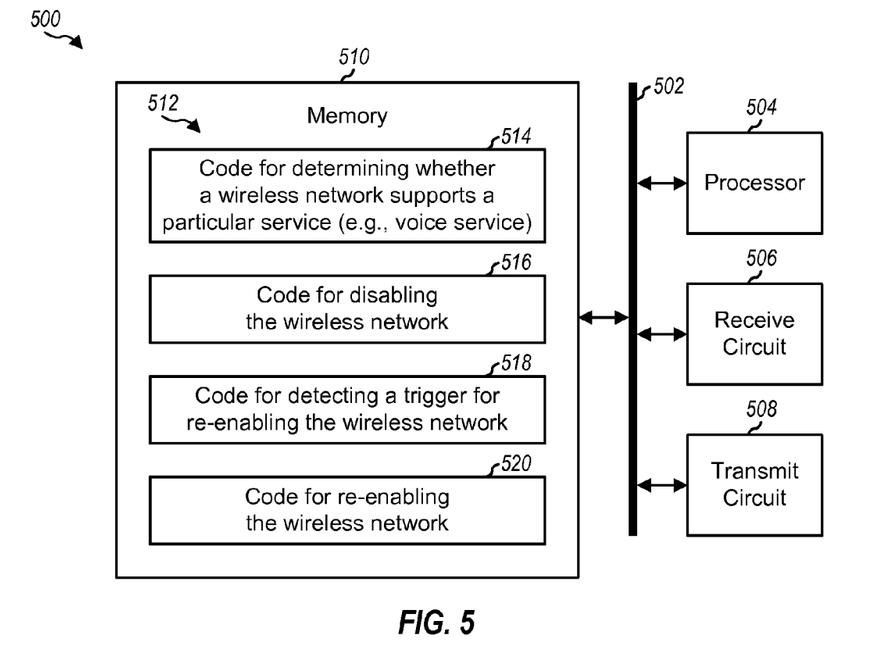
FIG. 5 shows an apparatus for obtaining communication with capability to disable and re-enable a wireless network.

FIG. 5 shows part of a hardware implementation of an apparatus 500 supporting wireless communication. Apparatus 500 includes circuitry and may be one configuration of a user entity (e.g., a UE) or some other entity. In this specification and the appended claims, the term "circuitry" is construed as a structural term and not as a functional term. For example, circuitry may be an aggregate of circuit components, such as a multiplicity of integrated circuit components, in the form of processing and/or memory cells, units, blocks and the like, such as shown and described in FIG. 5.

Apparatus 500 comprises a central data bus 502 linking several circuits together. The circuits include a processor 504, a receive circuit 506, a transmit circuit 508, and a memory 510. Memory 510 is in electronic communication with processor 504, so that processor 504 may read information from and/or write information to memory 510. Processor 504 may be a general purpose processor, a central processing unit (CPU), a microprocessor, a digital signal processor (DSP), a controller, a microcontroller, a state machine, an application specific integrated circuit (ASIC), a programmable logic device (PLD), a field programmable gate array (FPGA), etc. Processor 504 may include a combination of processing devices, e.g., a combination of a DSP and a microprocessor, a plurality of microprocessors, one or more microprocessors in conjunction with a DSP core, or any other such configuration.

Receive circuit 506 and transmit circuit 508 may be connected to a radio frequency (RF) circuit (not shown in FIG. 5). Receive circuit 506 may process and buffer received signals before sending the signals out to data bus 502. Transmit circuit 508 may process and buffer data from data bus 502 before sending the data out of apparatus 500. Processor 504 may perform the function of data management of data bus 502 and further the function of general data processing, including executing the instructional contents of memory 510. Transmit circuit 508 and receive circuit 506 may be external to processor 504 (as shown in FIG. 5) or may be part of processor 504.

Memory 510 stores a set of instructions 512 executable by processor 504 to implement the methods described herein. Instructions 512 may include code 514 for determining whether a wireless network supports a particular service (e.g., voice service), code 516 for disabling the wireless network if it does not support the particular service, code 518 for detecting a trigger (e.g., a timer expiration or an event) for re-enabling the wireless network, and code 520 for re-enabling the wireless network based on the trigger. Instructions 512 may include other codes for other functions.

Instructions 512 shown in memory 510 may comprise any type of computer-readable statement(s). For example, instructions 512 in memory 510 may refer to one or more programs, routines, sub-routines, modules, functions, procedures, data sets, etc. Instructions 512 may comprise a single computer-readable statement or many computer-readable statements.

Memory 510 may be a RAM (Random Access Memory) circuit. Memory 510 may be tied to another memory circuit (not shown) which may either be of a volatile or a nonvolatile type. As an alternative, memory 510 may be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art. Memory 510 may be considered to be an example of a computer-program product that comprises a computer-readable medium with instructions 512 stored therein.

Figure 6:
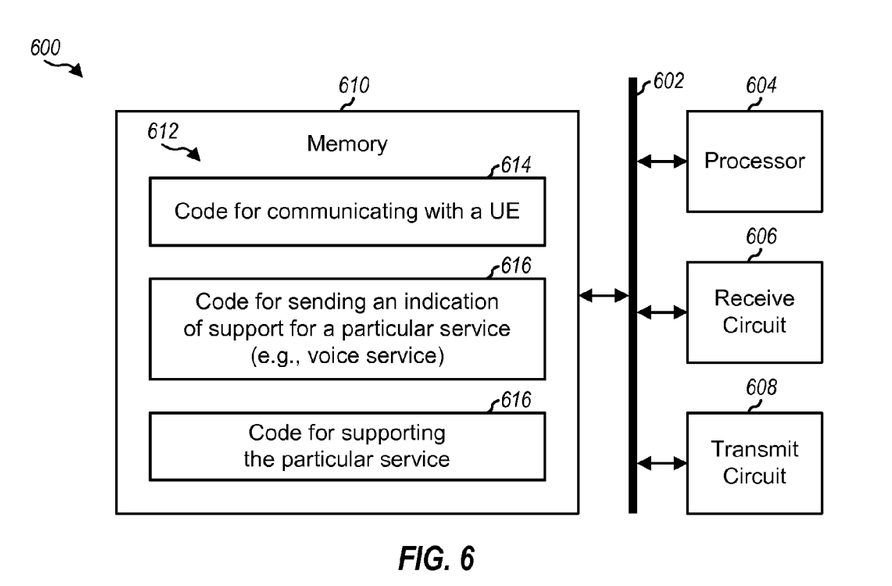
FIG. 6 shows an apparatus supporting communication.

FIG. 6 shows part of a hardware implementation of an apparatus 600 supporting wireless communication. Apparatus 600 includes circuitry and may be one configuration of a base station/eNB or some other entity. Apparatus 600 comprises a central data bus 602, a processor 604, a receive circuit 606, a transmit circuit 608, and a memory 610, which may be implemented as described above for central data bus 502, processor 504, receive circuit 506, transmit circuit 508, and memory 510 in FIG. 5.

Memory 610 includes a set of instructions 612 executable by processor 604 to implement the methods described herein. Instructions 612 may include code 614 for communicating with a UE, code 616 for sending an indication of support for a particular service (e.g., voice service), and code 618 for supporting the particular service. Instructions 612 may include other codes for other functions.

Figure 7:
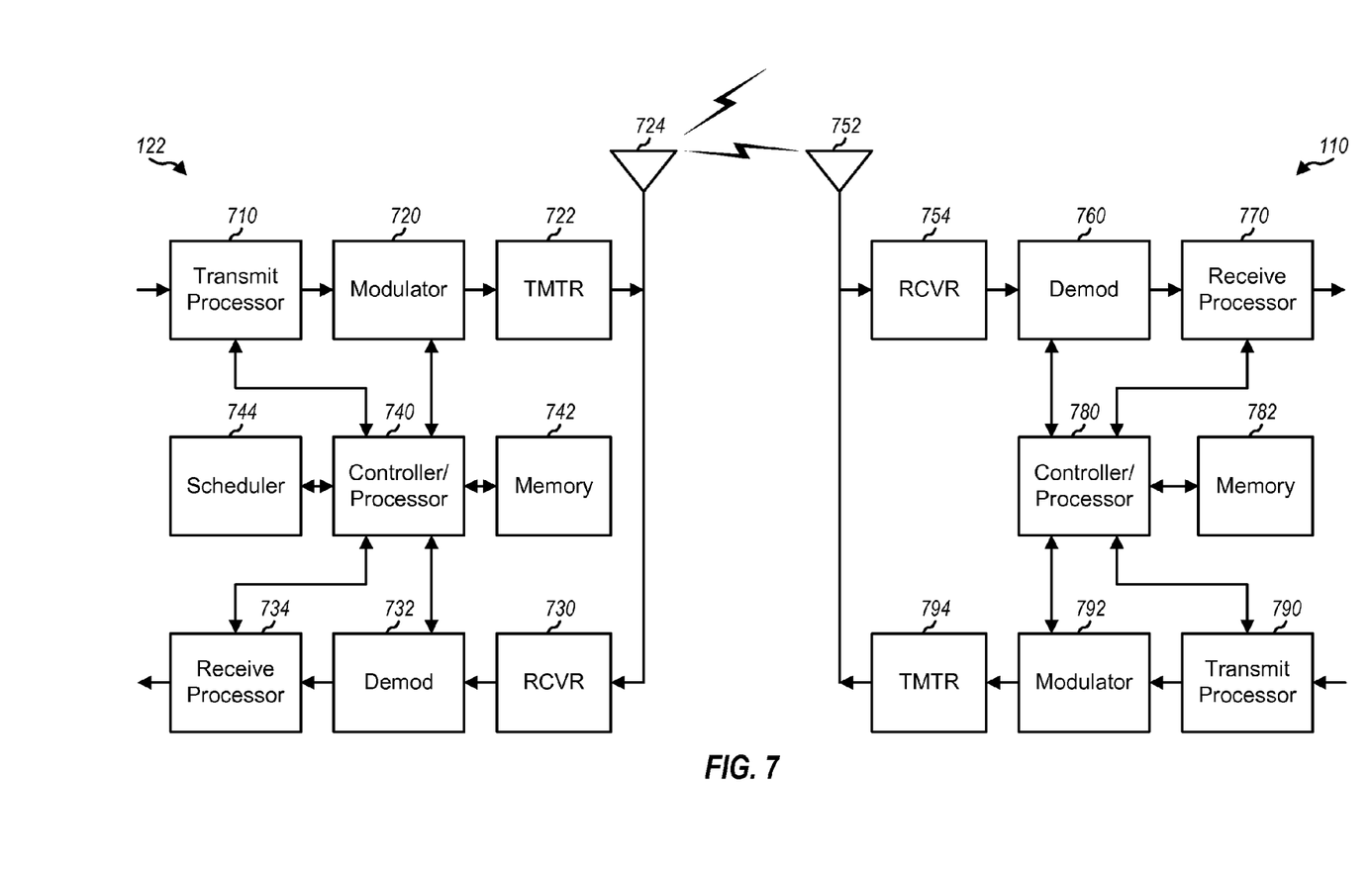
FIG. 7 shows a block diagram of a base station and a UE.

FIG. 7 shows a block diagram of a design of UE 110 and base station 122, which may be one of the base stations/eNBs in FIG. 1. At base station 122, a transmit processor 710 may receive traffic data for one or more UEs from a data source (not shown), process (e.g., encode, interleave, and symbol map) the traffic data for each UE, and provide data symbols for all UEs. Transmit processor 710 may also process control information from a controller/processor 740 and provide control symbols. A modulator 720 may process the data symbols, control symbols, and reference symbols (e.g., for OFDM, etc.) and provides output samples. A transmitter (TMTR) 722 may condition (e.g., convert to analog, amplify, filter, and frequency upconvert) the output samples and generate a downlink signal, which may be transmitted via an antenna 724.

At UE 110, an antenna 752 may receive the downlink signals from base station 122 and other base stations and may provide a received signal to a receiver (RCVR) 754. Receiver 754 may condition (e.g., filter, amplify, frequency downconvert, and digitize) the received signal and provide received samples. A demodulator (Demod) 760 may process the received samples (e.g., for OFDM, etc.) to obtain received symbols. A receive processor 770 may process (e.g., symbol demap, deinterleave, and decode) the received symbols and provide decoded traffic data and control information for UE 110.

On the uplink, at UE 110, traffic data and control information to be sent by UE 110 may be processed by a transmit processor 790, modulated by a modulator 792, conditioned by a transmitter 794, and transmitted via antenna 752. At base station 122, the uplink signals from UE 110 and other UEs may be received by antenna 724, conditioned by a receiver 730, demodulated by a demodulator 732, and processed by a receive processor 734 to recover the traffic data and control information sent by the UE 110 and other UEs.

Controllers 740 and 780 may direct the operation at base station 122 and UE 110, respectively. Processor 780 and/or other processors and modules at UE 110 may perform or direct process 300 in FIG. 3, process 400 in FIG. 4, and/or other processes for the techniques described herein. Memories 742 and 782 may store data and program codes for base station 122 and UE 110, respectively. A scheduler 744 may schedule UEs for downlink and/or uplink transmission and may provide assignments of resources for the scheduled UEs.

The functions described herein may be implemented in hardware, software, firmware, or any combination thereof If implemented in software, the functions may be stored as one or more instructions on a computer-readable medium. The term "computer-readable medium" or "computer program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the networks, methods, and apparatus described herein without departing from the scope of the claims.

No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communication, comprising:
 determining that a first wireless network does not support a particular service at a first location;
 disabling the first wireless network in response to determining that the first wireless network does not support the particular service at the first location;
 starting a timer upon disabling the first wireless network;
 refraining from attempting to obtain the particular service from the first wireless network while the first wireless network is disabled;
 determining a trigger based on expiration of the timer; and
 re-enabling the first wireless network based on the trigger, the trigger not resulting from a change in wireless network for a user entity or the user entity being powered off and on.

2. The method of claim 1, further comprising:
 determining that the first wireless network supports the particular service at a second location; and
 obtaining the particular service from the first wireless network at the second location.

3. The method of claim 1, wherein the particular service is voice service.

4. The method of claim 3, wherein the user entity is a voice-centric user entity and reverts to a voice-capable wireless network in response to determining that the first wireless network does not support voice service.

5. The method of claim 3, wherein the determining that the first wireless network does not support the particular service at the first location comprises:
 determining that the first wireless network does not support voice service at the first location based on an indication that circuit-switched fall back is not supported or not preferred by the first wireless network, or that circuit-switched registration failed for the user entity, or that circuit-switched registration is available only for short message service.

6. The method of claim 1, wherein the first wireless network supports the particular service in only a portion of a coverage area of the first wireless network.

7. The method of claim 1, further comprising:
 setting the timer to a fixed value.

8. The method of claim 1, further comprising:
 setting the timer to a progressively longer value each time the first wireless network is disabled.

9. The method of claim 1, further comprising:
 setting the timer to a variable value determined based on detected movement of the user entity or frequency of cell reselection by the user entity.

10. The method of claim 1, further comprising:
 determining a second trigger based on occurrence of a designated event at the user entity.

11. The method of claim 1, further comprising:
 detecting movement by the user entity; and
 determining a second trigger based on the detected movement by the user entity.

12. The method of claim 1, further comprising:
 receiving broadcast information from a second wireless network, the broadcast information indicating the particular service being available from the first wireless network; and
 determining a second trigger based on the broadcast information.

13. The method of claim 1, further comprising:
 initiating cell search and system selection by the user entity in response to re-enabling the first wireless network; and
 enabling selection of the first wireless network during cell search and system selection.

14. The method of claim 1, further comprising:
 performing cell search and system selection by the user entity based on a schedule determined for the user entity; and
 enabling selection of the first wireless network during cell search and system selection after re-enabling the first wireless network.

15. The method of claim 1, further comprising:
 obtaining the particular service from a second wireless network after disabling the first wireless network.

16. The method of claim 15, wherein the second wireless network is less preferred than the first wireless network for the user entity.

17. The method of claim 1, further comprising:
 repeating disabling and re-enabling the first wireless network for a plurality of times.

18. The method of claim 1, wherein the first wireless network comprises an evolved universal mobile telecommunication system terrestrial radio access network.

19. An apparatus for wireless communication, comprising:
 means for determining that a first wireless network does not support a particular service at a first location;
 means for disabling the first wireless network in response to determining that the first wireless network does not support the particular service at the first location;
 means for starting a timer upon disabling the first wireless network;
 means for refraining from attempting to obtain the particular service from the first wireless network while the first wireless network is disabled;
 means for determining a trigger based on expiration of the timer; and
 means for re-enabling the first wireless network based on the trigger, the trigger not resulting from a change in wireless network for a user entity or the user entity being powered off and on.

20. The apparatus of claim 19, further comprising:
 means for determining that the first wireless network supports the particular service at a second location; and
 means for obtaining the particular service from the first wireless network at the second location.

21. The apparatus of claim 19, further comprising:
 means for determining a second trigger based on occurrence of a designated event at the user entity.

22. The apparatus of claim 19, further comprising:
 means for receiving broadcast information from a second wireless network, the broadcast information indicating the particular service being available from the first wireless network; and
 means for determining a second trigger based on the broadcast information.

23. An apparatus for wireless communication, comprising:
 circuitry configured to determine that a first wireless network does not support a particular service at a first location, to disable the first wireless network in response to determining that the first wireless network does not support the particular service at the first location, to start a timer upon disabling the first wireless network, to refrain from attempting to obtain the particular service from the first wireless network while the first wireless network is disabled, to determine a trigger based on expiration of the timer, and to re-enable the first wireless network based on the trigger, the trigger not resulting from a change in wireless network for a user entity or the user entity being powered off and on.

24. The apparatus of claim 23, wherein the circuitry is further configured to determine that the first wireless network supports the particular service at a second location, and to obtain the particular service from the first wireless network at the second location.

25. The apparatus of claim 23, wherein the circuitry is further configured to determine a second trigger based on occurrence of a designated event at the user entity.

26. The apparatus of claim 23, wherein the circuitry is further configured to receive broadcast information from a second wireless network, the broadcast information indicating the particular service being available from the first wireless network, and to determine a second trigger based on the broadcast information.

27. A computer program product, comprising:

a non-transitory computer-readable medium comprising:

code for causing at least one computer to determine that a first wireless network does not support a particular service at a first location:

code for causing the at least one computer to disable the first wireless network in response to determining that the first wireless network does not support the particular service at the first location:

code for causing the at least one computer to start a timer upon disabling the first wireless network;

code for causing the at least one computer to refrain from attempting to obtain the particular service from the first wireless network while the first wireless network is disabled:

code for causing the at least one computer to determine a trigger based on expiration of the timer; and code for causing the at least one computer to re-enable the first wireless network based on the trigger, the trigger not resulting from a change in wireless network for a user entity or the user entity being powered off and on.

\* \* \* \* \*